United States Patent [19]

Schipper

[11] Patent Number: 4,864,963
[45] Date of Patent: Sep. 12, 1989

[54] INDICATING MEANS FOR VALVE OPEN OR CLOSED POSITION

[76] Inventor: Dennis J. Schipper, 1304 Clearview Dr., St. Charles, Mo. 63301

[21] Appl. No.: 611,050

[22] Filed: May 16, 1984

Related U.S. Application Data

[63] Continuation of Ser. No. 351,053, Feb. 22, 1982, abandoned.

[51] Int. Cl.⁴ ............................................. F16K 37/00
[52] U.S. Cl. .................................................. 116/277
[58] Field of Search ....................... 116/277, 282, 321; 414/270

[56] References Cited

U.S. PATENT DOCUMENTS

| | | | | |
|---|---|---|---|---|
| 401,140 | 4/1889 | Elder | | 116/282 |
| 577,147 | 2/1897 | Paul | | 116/277 |
| 1,806,462 | 5/1931 | Hopkins | | 116/277 |
| 2,351,613 | 6/1944 | Hopkins | | 116/277 |
| 2,438,294 | 3/1948 | Matthews | | 116/282 |
| 3,730,360 | 5/1973 | Aquino | | 414/270 |

*Primary Examiner*—William A. Cuchlinski, Jr.

[57] ABSTRACT

Indicating means are preferably provided to indicate to the operator whether a valve means on each side of an outlet is in open or closed position. This indicating means comprises an indicating lever attached to a peripheral portion of a valve shaft and engaging indicating shafts which extend to one or either side of the outlet. A pivot point is provided on the indicating lever to cause the indicating shafts to move in opposite directions as the valve is opened and the indicating lever is moved. If an indicating shaft projects outwardly from the side of the outlet, the attendant knows the valve means is in open position.

4 Claims, 3 Drawing Sheets

U.S. Patent  Sep. 12, 1989  Sheet 1 of 3  4,864,963
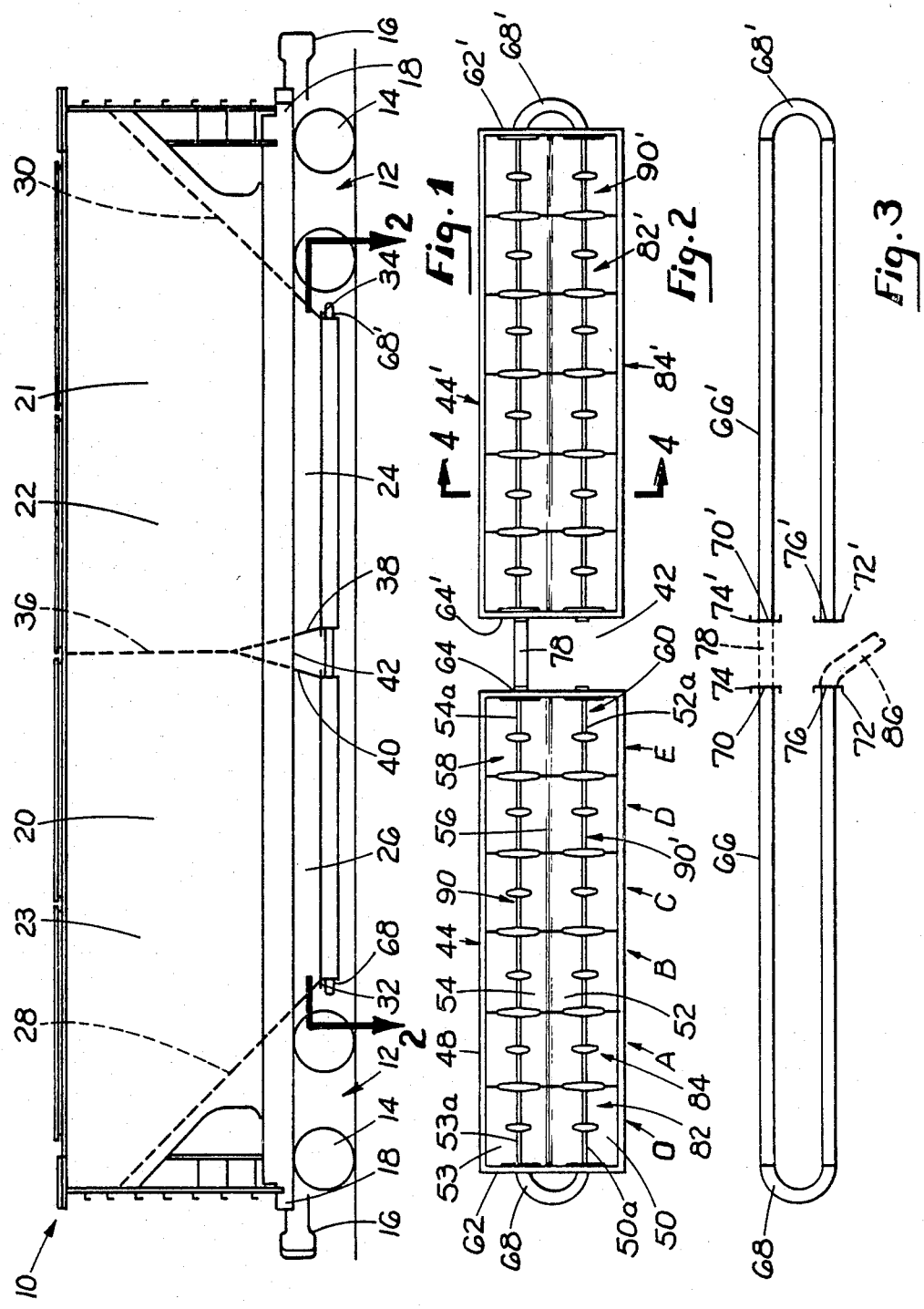

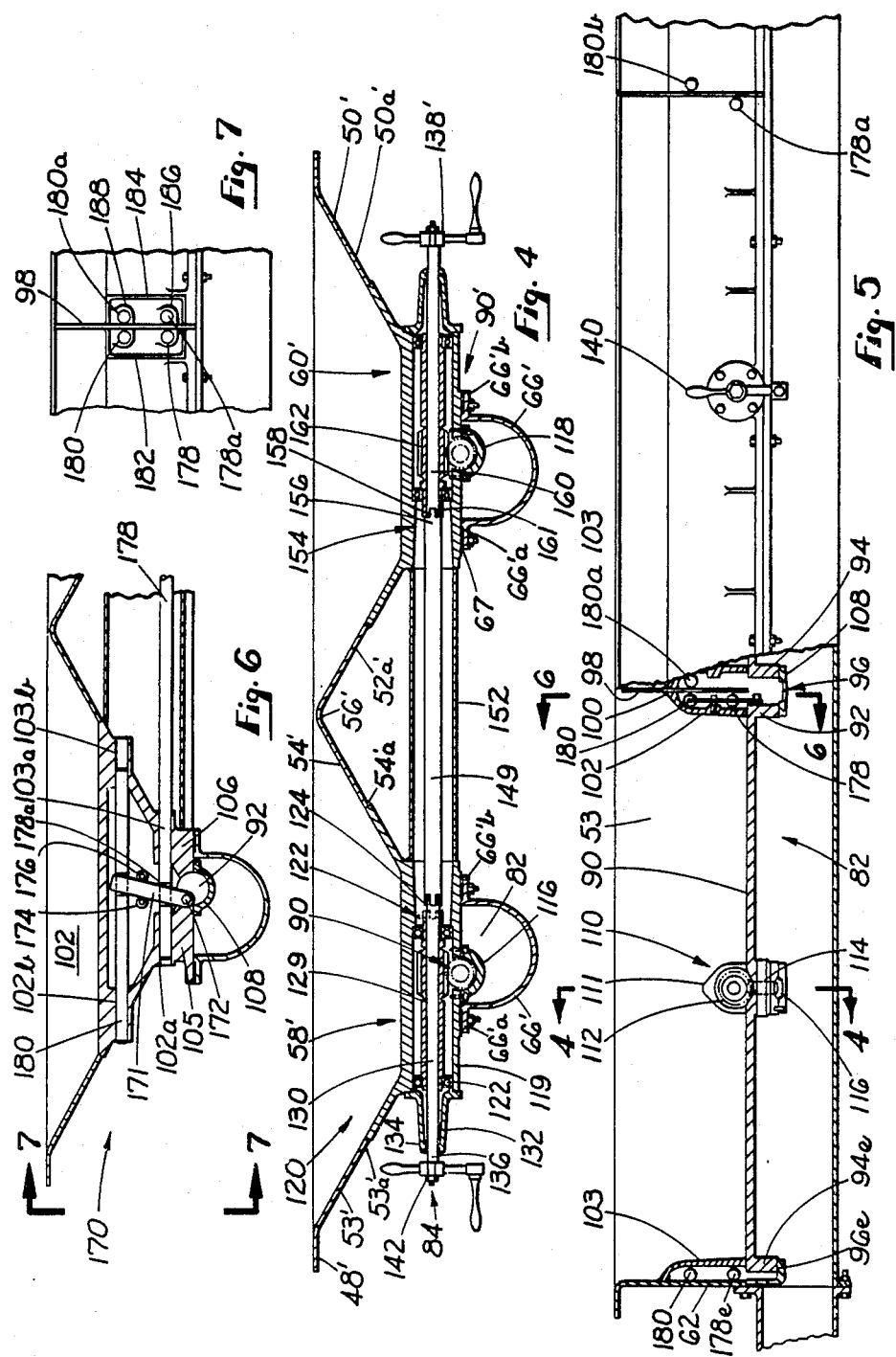

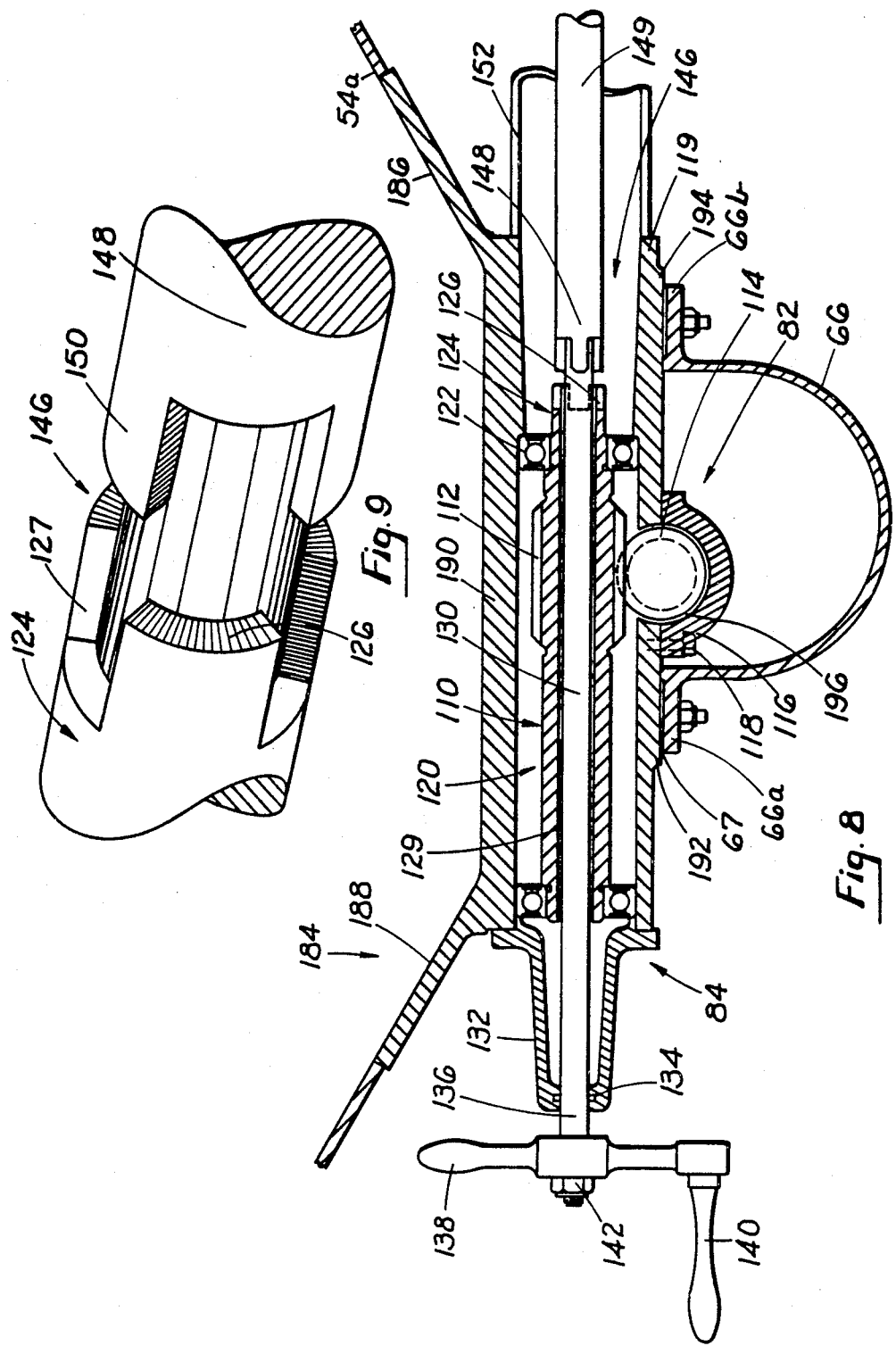

INDICATING MEANS FOR VALVE OPEN OR CLOSED POSITION

This is a continuation, of application Ser. No. 351,053, filed Feb. 22, 1982 now abandoned.

BACKGROUND OF THE INVENTION

In a railway hopper car, it is desirable for the attendants to be able to tell at a glance whether one or all valve members on either side of the car are open or closed.

U.S. Pat. No. 3,730,360 discloses indicating flags which indicate the open or closed condition of discharge doors.

However, this patent does not teach an indicating system useful with an operating shaft effective to open and close valve members in the outlet.

SUMMARY OF THE INVENTION

Indicating means are preferably provided to indicate to an attendant whether valve means in an outlet is in open or closed position. This indicating means preferably comprises an indicating lever attached to a peripheral portion of a valve shaft. Preferably the indicating lever engages indicating shafts which extend to either side of the outlet. A pivot point is preferably provided on the indicating lever to cause the indicating shafts to move in opposite directions as the valve is open and the indicating lever is moved. If an indicating shaft projects outwardly from the side of the outlet, the operator knows the valve means is in open position.

IN THE DRAWINGS

FIG. 1 is a side elevation view of a railway hopper car according to the present invention.

FIG. 2 is a bottom view looking in the direction of the arrows along the line 2—2 in FIG. 1.

FIG. 3 is a detail view looking at the bottom of FIG. 2 of the discharge conduit assembly.

FIG. 4 is a vertical sectional view looking in the direction of the arrows along the line 4—4 in FIG. 2.

FIG. 5 is a side elevation view with parts broken away, of the valve means and actuating means used in the outlet of the present invention.

FIG. 6 is a sectional view looking in the direction of the arrows along the line 6—6 in FIG. 5.

FIG. 7 is a detail side elevation view illustrating the indicating members at the side of the car, and looking FIG. 8 is an enlarged detail view of the valve means and actuating means of the present invention.

FIG. 9 is a schematic perspective view of the interconnecting portions of the actuating means of the present invention.

DESCRIPTION OF PREFERRED EMBODIMENTS

In the drawings a railway hopper car 10 is supported at opposite ends by means of trucks 12 having wheels 14. Couplers 16 join adjacent cars and extend into a stub sill 18. Each hopper car includes at least a pair of hoppers 20 and 22. Each of the hoppers include hopper slope sheets 24 and 26 and respective end hopper slope sheets 28 and 30 which have attached at their lower inner ends an outlet frame and mounting flange respectively 32 and 34. A transverse bulkhead 36 divides the car into two compartments 21 and 23. At the base of the transverse bulkhead respective transverse plates 38 and 40 are provided which further divide the car into compartments 21 and 23 and provide an open area 42 between the compartments.

Attached to the respective mounting frames 32 and 34 are a pair of outlets indicated at 44 and 44'Since the outlets are constructed the same only one will be described. Each of the outlets include a horizontal extending mounting frame 48 (FIG. 1) which abuts the respective mounting frames 32 and 34. The outlet includes transversely spaced outlet side walls 50 and 53 extending downwardly and inwardly from the mounting frame. In addition, outlet the center walls 52 and 54 extend downwardly and away from each other, defining within the outlet a shreading rib 56. One one side of the outlet the inner ends 53a and 54a of the walls 53 and 54 define a discharge opening 58. On the other side of the outlet the inner end 50a and 52a define another discharge opening 60. At opposite ends of the outlets are end walls 62 and 62', 64 and 64'. End walls 64 and 64' are located adjacent the open area 42. Discharge conduits 66, 66' are attached to outwardly extending flange portions 50b and 52b of hopper walls 50 and 52, and flange portions 53b, 54b of each outlet 44, 44', and attached to the end walls 62 and 62' are discharge conduits 68 and 68' joining the opposite portions of discharge conduits 66, 66'. Each discharge conduit 66, 66' terminates adjacent the open area 42 and includes end portions 70, 70' and 72, 72'. In transit, discharge caps 74, 74', 76, 76' are applied to each of the end portions. When the caps 74, 74', 76, 76' are removed a flexible connector 78 is adapted to join adjacent end portions 70, 70', 72, 72'. A valve means 82, 82' and a valve actuating means 84, 84' are provided to open and close communication between the railway car and the discharge conduits 66, 66' to be described hereinafter. If unloading is to occur from the left side of the car as shown in FIG. 2, a vacuum connection 86 is connected to end portion 72. End portion 72' is left open for air to enter. Discharge conduits 66, 66' together with end portions 68, 68' provide a continuous loop extending throughout the whole car beneath both outlets 44 and 44' for discharging the lading. Actuating means 84 and valve means 82 provide the necessary fluid communications between the interior of the car and the discharge conduit whereby vacuum suction applied through vacuum connection 86 can unload the entire car. It will be apparent that if unloading is to occur from the other side of the car a flexible connector 80 will be connected to the end portions 70,70' and the other will be left open for air to enter for pneumatic discharge.

It will be appreciated that this arrangement provides for greater volumetric capacity than previous constructions. The dog house or void space normally located between adjacent hoppers is eliminated in the construction of this invention and this area is used for lading carrying capacity.

It is also to be noted that the side slope sheets 24 and 26 and the end slope sheets 28 and 30 extend down significantly below the stub sill 18 to maximize volumetric carrying capacity. In addition, the spaces between adjacent outlets normally utilized in hopper cars is eliminated with the construction of the present invention and instead the outlets 44 and 44' continuously connect to the outlet slope sheets 24 and 26, again achieving greater volumetric carrying capacity.

In accordance with another feature of the present invention, a unique valve means 82, 82' is provided. This valve means includes an arcuate segment 90, 90' extending between the respective inner ends of the flanges in each of the outlets 44, 44'. Each arcuate segment 90, 90' is integrally connected to a stub shaft 92 and 94 at opposite ends thereof and is journalled for rotation. Valve segment supports 96, 96e are provided at opposite ends of the arcuate valve elements. These supports 96 comprise transverse plates 98 extending transversely across the upper portion of each outlet, and end walls 62, 64, 64', 62'. Plates 98 are welded to the respective outlet side walls at 100. Depending from transverse plates 98 are shaft support members 102 and 103 (FIGS. 5 and 6) adjacent shaft ends 92 and 94. Shaft support members 102 and 103 each include shaft support members 105 and 106. Depending valve supports 108 join supports 105 and 106.

Actuating means 84, 84' for the valve means 82, 82' preferably comprises a worm gear 110 (FIGS. 5 & 8) located in a housing 111 including a gear portion 112. Arcuate segment 90 is provided with a cooperating gear 114. An arcuate valve support 116 is held in place with fasteners 118 extending into a transverse gear support 119.

When discharge conduit 66 is applied, an elastomeric sealing gasket 67 is located between the discharge conduit flange portion 66'a/b and transverse car support 119.

Integral with worm gear 110 is a worm gear drive 120. Worm gear drive is sealed with respect to the interior of the outlet with a worm gear drive bearing assembly 122. Worm gear drive bearing assembly 122 is commercially available and may be purchased from Boston Gear Corporation is Boston, Massachusetts.

Worm gear drive 120 further includes an inner end, non-round slot connection portion 124 including slots 127 (FIG. 8). Worm gear drive 120 is hollow as indicated at 129 and extending therethrough is a worm gear operating shaft 130. Worm gear operating shaft further extends outwardly through an actuating shaft cap 132 having a seal therein 134. At its outer end portion 136, shaft 130 is provided with an operating handle 138 having a gripping extension 140. The handle 138 is held in place on the actuating shaft by means of a threaded nut 142.

Actuating shaft 130 includes a first engaging means 146 preferably comprising a non-round portion 148 of larger diameter and a projection 150 adapted to be inserted within non-round portion 126 of worm gear drive 120 and into slots 127.

Actuating portion 149 further extends transversely of the outlet through an aluminum pipe 152 to the other side of the car. At the other side of the car the actuating portion 149 includes a second gear engaging means 154 preferably comprising a non-round connection portion 156 having a projection 158 which engages a worm gear drive 160 having a slot 161 in a worm gear drive located on this side of the car. Worm gear drive 160 is integral with a worm gear 162 which actuates arcuate valve member 90' in the same way as does worm gear 110. It is not believed further description of the worm gear on this side of the outlet is required because it is structurally the same and operates the same as worm gear 110 on a near side of the outlet.

It will be apparent that actuating shaft non-round connection portion 148 is spaced from non-round connection portion 126 on the worm gear drive 120 in a neutral position. To actuate the valve means on the near side of the outlet the operator grasps the handle 130 and pulls the actuating shaft 130 to engage the connection portion 148 with the connection portion 126, with projection 150 engaging slot 127. Then rotation by the operator of the handle 138 rotates worm gear drive 120, worm gear 110 and in turn arcuate segment valve 90. Stub shafts 92 and 94e will rotate within shaft supports 96e, 108 and 116. Valve member 90 is thus rotated to an open position to allow discharge of loading from the interior of the car into discharge conduit 66.

Rotation of the handle 138 in the opposite direction will return valve segment 90 to the closed position.

The actuating shaft 130 may then be returned to the neutral position shown in FIG. 4 by pushing with the handle 138.

To actuate the valve segment 90' on the opposite side of the outlet, the operator pushes upon the handle 138 to move the actuating shaft 130 from left to right in FIGS. 4 and 7. This causes second shaft connection portion 154 to engage worm gear drive connection portion 161. Then rotation of handle 138 will cause the worm gear 162 to rotate, and cause valve segment 90' to rotate to the open position.

Rotation of the handle 138 in the opposite direction will return the valve segment 90' to the position shown in solid lines in FIG. 4. The actuating shaft may then be pulled a short distance to return it to the neutral position shown on the left side of FIG. 4.

Another feature of the invention includes open and closed position valve indicating means 170.

As shown in FIG. 6, shaft stub 92 has attached thereto an indicating lever 171 adjacent the outer periphery thereof by means of a fastener 172. A pair of laterally spaced guide pins 174 and 176 guide vertical movement of the indicating lever. Openings 102a and 103a provided in support 102 receive a first indicating rod 178. Rod 178 includes an opening 178a through which passes indicating lever 171. Indicating rod 178 extends to the opposite side of the car. Second openings 102b and 103b allow insertion of a second indicating rod 180 which extends to the near side of the outlet.

when the valve 90 is in the closed position the indicating lever 171 and the indicating rods 178 and 180 are in the position shown in FIG. 6 and do not project from either side of the car. When the valve 90 on the near side of the outlet is rotated to the open position by means of handle 138, stub shaft 92 is rotated in the clockwise direction. This moves indicating rod 178 from left to right in FIG. 6, and shaft 180 from right to left since guide pins 174 and 176 provide a fulcrum point for lever 171.

As shown in FIG. 7 a pair of metal, preferably aluminum channels 182 and 184, are welded to transverse plates 98 on either side of the car outside of walls 53 and 50 respectively. Indicating shaft supports 186 and 188 are welded to the aluminum channels 182 and 184 and transverse plate 98. As is apparent from FIG. 6 when shaft 180 projects outwardly the operator knows that the near side valve segment 90 is open. On the far side of the outlet the rod 178 will be in a position extending outwardly to indicate on the far side of the outlet that the valve 90 is in open position.

On the far side of the outlet when valve segment 90' is in open position, a rod 180e will project to show the open position. When valve segment 90' is in open position, a rod 178e extending across the outlet will project to show the open condition. Note that rods 178, 180 and 178e, 180e and transversely spaced.

It is apparent that the outlet of the present invention is made up of a series of compartments O,A,B,C,D and E (FIG. 2). Each of the compartments comprises valve segments 90, 90' and an actuating means 84, 84' extending to each side of the car. The valve means 90, 90' are operable from either side of the car by virtue of the handles 138, 138' and the push/pull feature of the actuating shaft 130. In compartment O the operator can tell that the near side valve means 90 is open if the rod 180 projects from the right hand support. He can tell if the far side valve means is in the open position if the lower hand rod 178e projects outwardly from the support. This same information can be determined for compartments A through E constructed in the same manner as compartment O, each having respective indicating shafts 178 and 180, ie. 178a, 108a, on either side of the car.

Discharge conduit end portions 70, 70' and 72, 72' are provided to receive caps 74, 74' and 76, 76' in transit. For unloading, a flexible connection 78 for unloading on the near side of the car and a vacuum connection are provided, as discussed above.

The lower walls and valve seats are conveniently formed as a casting 184 (FIG. 8) including lower walls 186 and 188, and ribs 190. The casting is machined on its lower surface to define matting flanges 192 and 194. A tool (not shown) is used to form the opening 196 for the valve member 90. It is seen that the use of such casting is convenient through non-essential method of assembly of a portion of the outlet of the present invention. Separate castings are then welded to the respective outlet walls 50, 52, 53 and 54.

The outlets 44, 44' are made up of as many compartments as is desired to fabricate small or large outlets.

What is claimed is:

1. An indicating assembly for a container outlet comprising: a valve means located on each side of an outlet; each valve means connected respectively to a separate valve shaft; indicating means comprising an indicating lever attached to a peripheral portion of each valve shaft and engaging adjacent said valve shaft, at least one indicating shaft which extends to the side of the outlet, said indicating shaft being axially shiftable by said indicating lever such that when one of said valve means is in open position said one shaft extends outwardly from one side of the outlet to indicate that one valve means is in open position, when the other valve means is in open position at least one other separate shaft extends outwardly from one side of the outlet to indicate that said other valve means is in open position.

2. Indicating means according to claim 1, including pivot means engaging each of said indicating levers to cause said first and second indicating shafts to move in opposite directions as one of said valve means is opened and the indicating lever is moved.

3. Indicating means according to claim 2, wherein said pivot means comprises a guide pin located adjacent to said valve shaft.

4. Indicating means according to claim 3, including a pair of guide pins for said indicating lever.

* * * * *